United States Patent Office 3,320,695
Patented May 23, 1967

3,320,695
DEGRADABLE POLYOLEFIN MULCHING FILM
Edward P. Moore, Jr., Wilmington, Del., assignor to Hercules Incorporated, a corporation of Delaware
No Drawing. Filed June 25, 1964, Ser. No. 378,060
6 Claims. (Cl. 47—9)

This invention relates to plastic mulching film and, more particularly, to an opaque mulching film which is degradable under conditions of use.

Plastic in sheet or film form has been found to be a practical material for protecting plants and their roots from cold, heat, and drought, for controlling weeds, for retaining moisture in the ground, and for keeping fruits and vegetables clean. Plastic films have also been used to alter the climate of the seed zone and to reduce surface crusting, thereby improving seed germination and seedling emergence. Such films, which are available in colors from black to clear, cause marked changes in the temperature and moisture conditions of the covered soil, particularly in the surface portion of the profile. They also affect the amount of light reaching the soil surface, the amount of light passing through the film varying from zero in black to almost complete transmission with clear film. For many uses the absence of light is very desirable, as to prevent weed growth, to control soil temperature in very hot southerly climates, and for similar reasons.

A serious drawback in the commercial acceptance of opaque agricultural films concerns the problem of removing, picking up, and/or disposing of the film after it has served its purpose. Although techniques such as hand raking and burning, triple discing the film to chop it up and then plowing under, or flame treatments using flame throwers to pick up and burn the film have been tried, the film does not cut or burn easily and binds up tools and machinery so that the problem of film disposal and litter is very troublesome and costly. Additionally, the presence of chopped-up film in the soil after harvesting endangers future crops by interfering with normal root growth.

Now, in accordance with the present invention, it has been discovered that an opaque mulching film can be produced which will degrade at a controllable rate under conditions of use, i.e., upon exposure to outdoor weathering. Such a film, which is free of the pick-up and disposal problems of the prior art mulching films, can thus be used advantageously for many crops which were not previously amenable to plastic mulching.

Accordingly, the present invention is directed to a degradable agricultural mulching film comprising a film of a polyolefin containing sufficient pigment to render the film opaque and an additive capable of promoting degradation of the film at a controllable rate upon exposure to outdoor weathering.

Any polymer of a mono-olefin having at least 2 carbon atoms can be used to form the degradable film of the present invention. The polymer can be either a homopolymer or copolymer or a blend or alloy thereof with minor amounts of other film-forming materials. Particularly suitable are homopolymers or copolymers of ethylene, propylene, butene-1, pentene-1, 3-methyl butene-1, 4-methyl pentene-1, and the like.

As stated above, the polymer contains sufficient pigment to render film thereof opaque. A wide variety of pigments are suitable for this purpose, and the particular type and color selected for a given end use is largely a matter of choice. The amount of pigment necessary to produce opacity will, of course, vary with the particular pigment selected and will depend on such factors as particle size, degree of dispersion, and the like. Particularly useful pigments include carbon black and titanium dioxide, preferably in amounts ranging from about 1 to about 5% by weight of the polymer.

The polymer also contains an additive capable of promoting degradation of film therefrom at a controllable rate upon exposure to outdoor weathering. Various materials are known which become activated to catalysts in the presence of oxygen, light, and/or heat and act to promote the degradation of polymers containing them upon exposure to weathering. Any material of this type which does not adversely affect the other desirable properties of the film is useful within the scope of the present invention. Materials particularly suitable as additives include unsaturated hydrocarbons, unsaturated resinous materials such as nonhydrogenated polyterpenes, unsaturated coal tar by-product polymers such as coumarone-indene resins, rosin, and the like.

The amount of additive employed can vary within wide limits and, for a given use, can be predetermined by taking into account such factors as the particular additive and polyolefin employed, amount and type of pigment present, geographical location of use, slope of land to be covered, growing season of crop, and the like. Ordinarily, an amount ranging from about 2 to about 50% by weight of the polymer, and preferably from about 5 to about 35%, is adequate.

The additive and pigment can be incorporated into the polymer by any of the techniques known for blending a solid or a liquid with a polymer prior to formation into film. For example, the desired amounts of additive and pigment can be dry blended with the polymer, or the additive in solution or dispersion can be admixed with a solution or dispersion of the polymer in a suitable solvent.

In addition to the pigment and additive mentioned above, it is to be understood that other materials such as plasticizers, fillers, fertilizer components, insecticides, fungicides, and the like can be incorporated into the film. Such components offer the additional advantage of providing multiple functions not usually connected with mulching films.

The polyolefin of this invention containing pigment and additive can be formed into film (of any desired thickness) by conventional methods, as, for example, by extrusion of the molten material into tube or cast film, by casting a solution of the polymer in a suitable solvent onto a rotating drum, or by similar methods. The thickness of the film may vary over a wide range, and for practical purposes should be of sufficient thickness to afford a good ground cover without being subject to rupture or tear by laying equipment or the elements, but for purposes of economy should not be unduly thick. Ordinarily, film ranging from about 0.3 to about 5 mils, and preferably from about 0.5 to about 2 mils, thick will be sufficient for most purposes.

The invention will be illustrated by the following examples in which parts and percentages are by weight unless otherwise specified.

*Example 1*

An opaque film sample was prepared by compounding on a two-roll mill at about 171° C. for 5 minutes, polypropylene having a birefringent melting point of about 168° C. and a reduced specific viscosity of about 2.5 (measured on a 0.1% solution of decahydronaphthalene at 135° C.), 10% by weight of the polypropylene of a polyterpene resin having a melting point of 125–135° C. (Hercules drop method) and an iodine value of 150–170 and 2% carbon black, based on the weight of the polypropylene, and pressing the milled composition into sheet 5 mils thick. Four-inch squares cut from this sheet were fastened onto pieces of white cardboard and exposed to outdoor weathering on a fence in Wilmington, Delaware, at a 60° angle to the horizontal, facing south in May. During the outdoor exposure, the development of brittleness in each strip was observed by periodically examining the strip and noting the time elapsed until it became brittle, the embrittlement point being the time elapsed until a strip breaks apart when tapped at room temperature with the finger. A control sample was also prepared and exposed in the same manner except that the sheet was pressed from polypropylene containing 2% carbon black but no polyterpene resin. The film of this example became brittle and broke apart after 17 weeks whereas the control was still flexible after 52 weeks.

*Example 2*

The procedure of Example 1 was repeated except that polyethylene having a density of 0.92 was used in place of the polypropylene, and the milling was carried out at 115° C. The film after 22 weeks of exposure was brittle whereas a control film prepared and treated in the same manner but without the polyterpene resin was still flexible after 52 weeks.

*Example 3*

The procedure of Example 1 was repeated except that 20% of an unsaturated petroleum hydrocarbon polymer having a softening point of 162° C. (Hercules drop method), an iodine value of 131, and on ultraviolet absorption an alpha value of 8.5 at 260 millimicrons and a maximum at 258–260 millimicrons, based on the weight of the polypropylene, was substituted for the polyterpene resin. The film became brittle and broke apart after 15 weeks of outdoor exposure.

*Examples 4–5*

Opaque film samples were also prepared by extruding into film 1 mil thick at 233° C. a mixture of 100 parts of polypropylene, 5 or 20% of the polyterpene resin of Example 1 and 2 parts of carbon black. The films were trimmed to about 14″ width and laid down next to rows of tomato plants so as to provide an opening between the films for the plants to grow in May (10 days after planting) in Wilmington, Del. The films were anchored by burying the outer 2″ edge of the film in the ground. The embrittlement on outdoor exposure was evaluated as in Example 1. Details as to the film compositions and exposure data are tabulated below.

| Example No. | Polyterpene (percent) | Embrittlement Line (months) |
|---|---|---|
| 4 | 5 | 4 |
| 5 | 20 | 2 |

During the growing season visual observations were also made as to the crop and weed growth as well as compaction, amount of moisture and temperature of the soil in areas covered with the opaque plastic film as compared with areas which had not been covered. In all cases during the life of the film, the soil beneath was hotter and more moist. Additionally, the film of Example 4 gave an equal or better crop yield with no weed problem, as compared with areas where no film was used.

What I claim and desire to protect by Letters Patent is:

1. A degradable agricultural mulching film having a thickness of about 0.3 to about 5 mils and consisting of a polymer of a mono-olefin having 2 to 3 carbon atoms and, based on the weight of the polymer, from about 1 to about 5% of a pigment to render the film opaque and from about 2 to about 50% of an additive capable of degrading said film at a controllable rate within one growing season upon exposure to outdoor weathering, said additive being a resinous material selected from the group consisting of nonhydrogenated polyterpenes, coumarone-indene resins and rosin.

2. The degradable film of claim 1 wherein the polyolefin is polyethylene.

3. The degradable film of claim 1 wherein the polyolefin is polypropylene.

4. The degradable film of claim 1 wherein the additive is a polyterpene resin.

5. A method of mulching soil which comprises laying on the soil surface adjacent a plant bed a degradable film having a thickness of about 0.3 to about 5 mils and consisting essentially of a polymer of a mono-olefin having 2 to 3 carbon atoms and, based on the weight of the polymer, from about 1 to about 5% of a pigment to render the film opaque and from about 2 to about 50% of an additive capable of degrading said film at a controllable rate within one growing season upon exposure to outdoor weathering, said additive being a resinous material selected from the group consisting of nonhydrogenated polyterpenes, coumarone-indene resins, and rosin.

6. The method of claim 5 wherein the polymer is polypropylene and the additive is a nonhydrogenated polyterpene resin.

References Cited by the Examiner

UNITED STATES PATENTS

| | | | |
|---|---|---|---|
| 1,372,997 | 3/1921 | Eckart | 47—9 |
| 2,261,760 | 11/1941 | Habgood | 260—897 |
| 2,369,471 | 2/1945 | Latham | 260—897 |
| 2,453,644 | 11/1948 | Steinkraus | 260—897 |
| 2,631,954 | 3/1953 | Bright | 260—897 |
| 2,894,925 | 7/1959 | Morris et al. | 260—897 |
| 2,905,659 | 9/1959 | Miller et al. | 260—94.9 |
| 2,924,584 | 2/1960 | Wolinski | 260—897 |
| 3,967,845 | 1/1961 | Hawkins et al. | 260—41 |
| 3,077,054 | 2/1963 | Niemeijer | 47—9 |
| 3,112,300 | 11/1963 | Natta et al. | 260—897 |
| 3,252,250 | 5/1966 | Lemaire | 47—9 |

OTHER REFERENCES

Wakeman, R. L.: The Chemistry of Commercial Plastics (1947), Rheinhold Publishing Corp., pp. 290, 291.

Sheldrake, R., Jr.: "Plastic Mulch," New York Times (May 18, 1958), p. X19.

MURRAY TILLMAN, *Primary Examiner.*

ABRAHAM G. STONE, *Examiner.*

T. G. FIELD, JR., E. B. WOODRUFF, R. E. BAGWILL,
*Assistant Examiners.*